March 1, 1932. A. L. DUNCAN 1,847,298
FRUIT HALVING, CORING, AND PITTING APPARATUS
Filed Aug. 20, 1926 4 Sheets-Sheet 4

Inventor
Arthur L. Duncan

By William A. Strauch
Attorney

Patented Mar. 1, 1932

1,847,298

UNITED STATES PATENT OFFICE

ARTHUR L. DUNCAN, OF PIEDMONT, CALIFORNIA, ASSIGNOR, BY MESNE ASSIGNMENTS, TO PACIFIC MACHINERY COMPANY, OF SAN FRANCISCO, CALIFORNIA, A CORPORATION OF CALIFORNIA

FRUIT HALVING, CORING, AND PITTING APPARATUS

Application filed August 20, 1926. Serial No. 130,442.

This invention relates to a fruit halving and coring machine, especially adapted for the halving and pitting of peaches though it is capable of use in coring fruit of other kinds. The machine is hereinafter described as a peach pitting machine, without thereby intending to limit this invention to machines for pitting peaches, the machine being so described merely for the sake of convenience, and because it has several features that are designed with special reference to the halving and pitting of a peach. This application is a continuation in part of my copending application Serial No. 94,025, filed March 11, 1926.

An object of the invention is to produce a fruit coring or pitting machine that will rapidly and neatly halve a fruit and cut the core or pit from a fruit, and which is provided with means whereby the halves are positively ejected from the machine after the pitting operation.

A further object of the invention is to produce a fruit coring and pitting device in which means are provided to eject the core or pit from the machine after the halves of the fruit have been cut or severed from the core or pit.

A further object of the invention is to provide a power operated machine, which is set in operation by the operator moving a control after completing the feeding and halving movement.

A further object of the invention is to provide a machine of the type in which the operator feeds the fruit through spaced halving knives, providing a path for the pit of the peach between them, to a position between holding jaws and pitting knives that cooperate to clearly cut the pit from the peach, and in which a gauge is provided to accurately fix the extent of movement of the peach and to determine the final position of the pit relative to said jaws and knives.

A further object of the invention is to provide a machine in which a gauge is provided that determines the proper position of the peach pit in relation to the pitting knives before the pit removing operation and which is automatically retracted as the pitting knives are brought into position to serve their purpose so that the gauge clears the end of the peach thus eliminating injury to the fruit.

Another object of the invention is to provide automatically self adjusting pitting knives which open to allow passage between their ends of a fruit pit, and in closing closely embrace the suture of the whole pit and by so doing, automatically adjust themselves to the varying diametered pits at their suture.

Still another object of the invention is to provide a power driven machine with blades spaced apart to cut the flesh of the fruit substantially to the depth of a central core to be removed with pitting means normally set in alignment with the blades in a position to engage the core of the fruit starting in the plane of the suture of the pit, the pitting means being started in operation under manual control and automatically brought to rest in normal position after having severed the central core including the whole pit, from the fruit pulp.

A still further object of the invention is to provide halving blades that automatically adjust themselves to pits of varying or unusual sizes and in which the cutting edges thereof are maintained in parallelism at all positions of adjustment of said blades.

Further objects of the invention are defined by the scope of the appended claims and will appear as the description of the invention proceeds with reference to the accompanying drawings in which.

Similar reference characters indicate like parts throughout the several figures.

On a suitable base 1 are secured castings 2 and 3 provided with bearings 4 for the shaft 5. Shaft 5 has secured to it a pulley 6 which may be driven from any suitable source of power. Keyed to shaft 5 between castings 2 and 3 is a worm 7 meshing with a worm wheel 8 rotatably mounted on a sleeve 9 (see Figure 3) a bushing 10 being arranged between said worm wheel and sleeve. A hardened clutch ring 11 is rigidly secured in a recess in wheel 8 and is provided with a series, preferably six, of annularly arranged holes 12. A clutch pin 13 (Figures 2 and 3) is slidably supported in a suitable recess formed in sleeve 9 and is urged to the right in Figure 3 by a helical spring 13'. Pin 13 is controlled by a lever 14 pivoted at 14' to the frame and provided with a wedge-shaped end that rides in groove 15 on an enlarged portion of sleeve 9 and serves to intermittently couple said sleeve and worm wheel 8 together for a single revolution of said wheel. Pin 13 is provided with a groove 17 having an inclined side wall which is adapted to engage the inner beveled end of lever 14. In the position of parts shown, as sleeve 9 rotates the beveled end of lever 14 engages the inclined side wall of groove 17 camming the pin 13 to the left in Figure 3. This movement of the pin 13 disengages the reduced end 18 thereof from a hole 12 of the clutch disk 11, breaking the driving connection between sleeve 9 and wheel 8. An actuating rod 19, provided with an inclined nose 20 is slidably supported and guided in brackets 21 and 22 of the supporting frame work and is provided with a handle 23 in a position to be conveniently engaged by the operator when a peach or fruit is in a position to be cored. A spring 23' normally holds rod 19 to the left in Figure 2. When rod 19 is pressed to the right in Figure 2 nose 20 engages an inclined surface formed on the upper end of lever 14 forcing the inner end of lever 14 out of groove 15. This movement of the lever 14 disengages the beveled end thereof from the inclined side wall 17 of the pin 13 and permits the pin 13 to move to the right in Figure 3 under influence of its spring 13'. As a hole 12 of driving gear 8 comes into alignment with the reduced end 18 of pin 13, the end 18 nests in the hole 12 establishing a driving connection between worm wheel 8 and the sleeve 9. When rod 19 is released it moves to the position shown in Figure 2 releasing the lever 14 which moves inward to the position shown, again positioning the beveled end thereof to engage the inclined side wall of groove 17 and breaking the driving connection between worm wheel 8 and sleeve 9. In this way it will be seen that by shifting the rod 19 to the right in Figure 2 and immediately releasing it, a driving connection will be established between sleeve 9 and wheel 8 for one revolution of the sleeve only and at the end of a complete revolution the driving connection will be broken and the sleeve 9 comes to rest. If desired, any other well known form of single revolution clutch may be substituted for that just described. For example, a constantly engaged friction clutch may be interposed between the wheel 8 and the sleeve 9 and sleeve 9 may be provided with a suitable stop projection adapted to engage a movable stop member controlled by rod 19. Such clutches are well known and the application thereof in the present device will be obvious to one skilled in the art.

Sleeve 9 has formed upon its enlarged portion, cams 24 and 25, and secured to cam 25 is a projecting pin 26. Keyed to the reduced portion of sleeve 9 is a barrel cam 27 having a cam groove 28 cut therein, and arranged within sleeve 9 is the hollow main shaft 29. Shaft 29 is preferably enlarged in diameter as shown at 30 and is provided with a collar 31 at one end. Shaft 29 is supported in bushed main bearings 32 and 33 provided in castings 34 and 35 which are secured to and supported from base 1.

Figure 3:
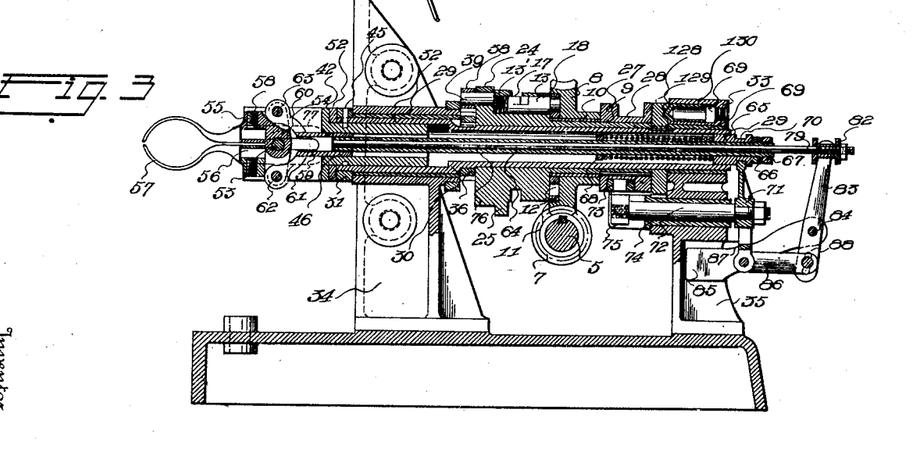
Figure 3 is a vertical cross sectional view, the halving blades and the brackets that support them being removed.
Figures 5, 6:
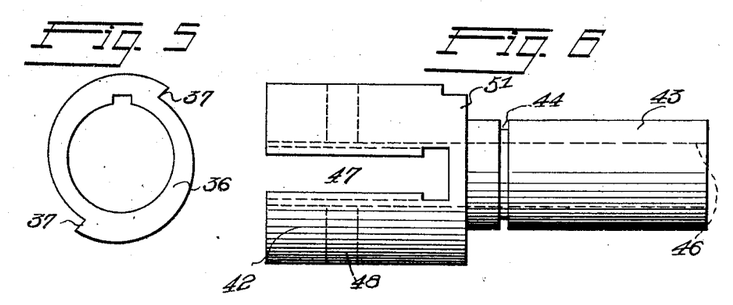
Figure 5 is a detail view of the ratchet that controls the main shaft.
Figures 6, 7 and 8 are plan, end and elevation views of the pitting knife carrying head.
Figure 7:
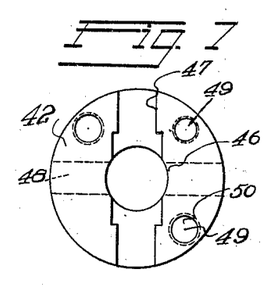

Keyed to and driving main shaft 29 is a ratchet wheel 36 with two diametrically opposite teeth 37 (Figures 3 and 5). Teeth 37 are engaged by a pawl 38 pivoted on pin 39 carried by cam 24 of sleeve 9. Pawl 38 is provided with a projecting lug 40 (Figure 1) overhanging the edge of a stationary cam 41, designed to throw the pawl out of engagement with ratchet 36 after the completion of a half revolution by the main shaft 29.

Figure 8:
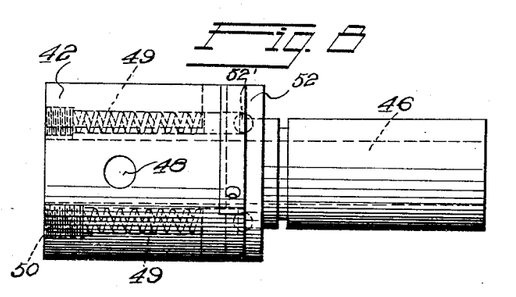

Attached to one end of the hollow main shaft is a knife carrying head 42 (Figures 3, 6, 7 and 8) provided with a tubular extension 43 that is provided with a circumferential groove 44 in its outer surface. Groove 44 registers with a bore 45 in collar 31 of the main shaft. A fillet or pin is inserted in bore 45 and groove 44 to hold head 42 from endwise movement while permitting relative rotation between the head and the main shaft 29. Head 42 is bored longitudinally as indicated by numeral 46, has a kerf 47 cut therein from one end, and the wings formed by said kerf are bored transversely as shown at 48. Bores 49 extending longitudinally of the wings of said head are also provided, said bores being provided with threaded plugs 50. Between shoulder 51 formed on head 42 and the collar 31 of the main shaft is arranged a hardened clutch disk 52 (Figures 3 and 8) having one or more circular depressions designed to partially receive one of the spring backed balls 52' which are arranged in bores 49, the springs and balls being held in bores 49 by threaded plugs 50, the whole arrangement being designed to permit the head to yield when an unusually large or mis-shaped pit is engaged by the pitting knives supported in the head, as will more fully hereinafter appear.

Arranged in bore 48 is a pin 53 (Figure 3) which passes through aligned ears 54 of two pitting knife carriers 55, serving to pivotally secure the carriers to the head 42. Each carrier is bored to receive the shank 56 of a curved pitting knife 57. The knives are provided with cutting edges beveled outwardly and are secured to the carriers by set screws 58, and the arrangement is such that other smaller or larger knives may readily be substituted to meet the requirements of the particular size of fruit being operated upon. Pitting knives 57 are swung toward and from each other on pin 53 by a control member 59 provided with arms 60 and 61 pivoted to ears 62 on the knife carriers 54 by means of pin 63. Pins 63 fit loosely in the knife carriers so that the arcuate movement of the carriers is permitted when control member 59 is reciprocated.

Member 59 is slidably supported in the bore 46 of head 42 and threaded in the end of member 59 disposed in head 42 is a hollow control rod 64. Rod 64 passes through the mainshaft 29 and is provided with a sliding collar 65 fitting the bore in the mainshaft and held from endwise displacement by nuts 66 and 67 threaded on rod 64. Another collar 68 is rigidly secured to rod 64 in any suitable manner and a coil spring 69 is arranged between sliding collar 65 and fixed collar 68. Sliding collar 65 is provided with a groove 70, the walls of which are engaged by the forked end of a member 71, secured to the end of a cam rod 72. Secured to the opposite end of rod 72 in any suitable manner is a cam roller 73 riding in cam groove 28 before referred to. A tubular guide member 74 having a bifurcated guide end 75 serves to guide cam rod 72 in its movement.

Figure 9:
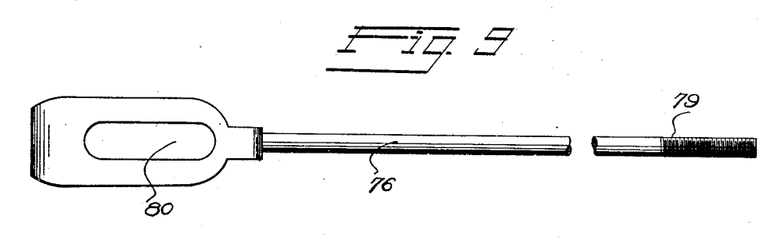
Figures 9 and 10 are detail views of the pit gauge.
Figure 10:
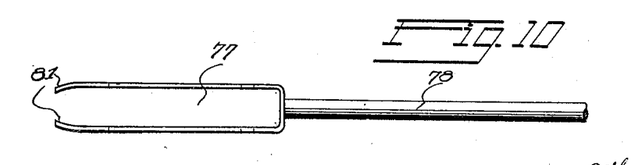
Figure 11:
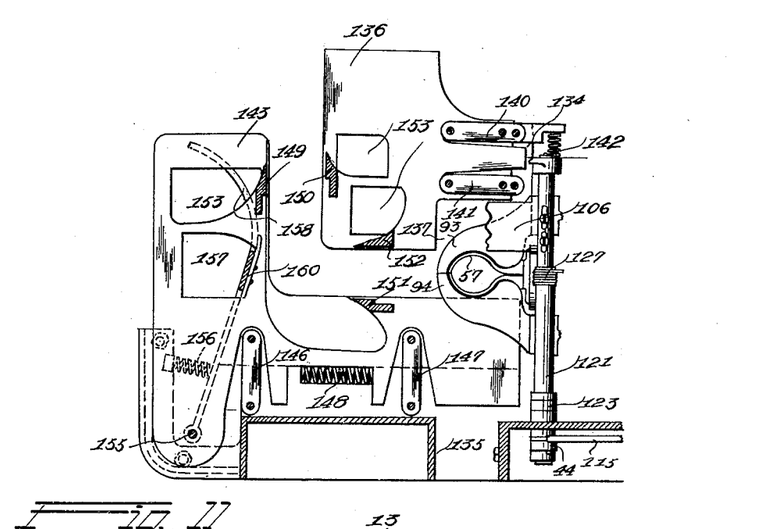
Figure 11 is a vertical sectional view showing the manner of mounting the feed blades.
Figures 12, 13:
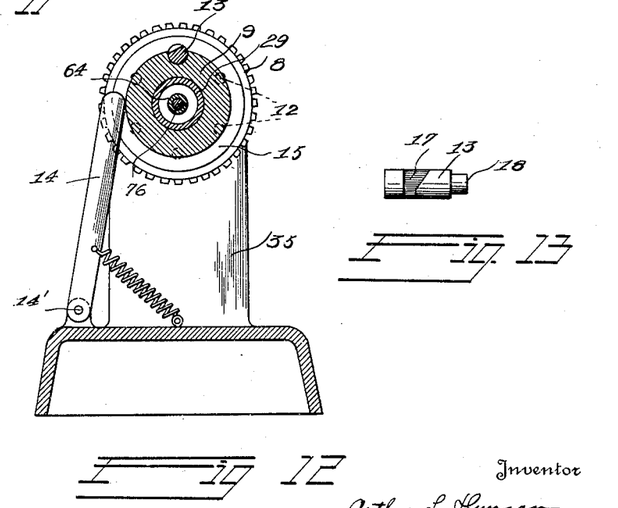
Figure 12 is a transverse sectional view taken along the left hand wall of the groove for guiding the clutch control lever.
Figure 13 is a detailed view of the clutch pin.

Arranged in the head 42 is a gauge 76 (Figures 3, 9 and 10) that includes a V-shaped portion 77 attached to a rod 78 threaded at one end as shown at 79. The wings of the U-shaped portion are slotted as shown at 80 and the ends thereof are turned inward slightly providing an abutment for the pit of the peach when it is fed into the machine. The wings of portion 77 are arranged at opposite sides of head 42 and the pin 53 passes through slots 80 that portion of 77 which connects the wings being arranged in kerf 47 in the head. The elongated slots permit endwise movement of the gauge relative to said head. Rod 76 passes through the hollow control rod 64 as shown in Figure 3 and has a grooved collar 82 secured to the end thereof. The forked end of a lever 83 fulcrumed at 84 to a bracket 85 secured to the casting 35 engages collar 82. A link 86, arranged between an extension 87 of member 71 before referred to and an extension 88 of lever 83 serves to transmit motion in a reverse direction from cam rod 72 to said gauge 76.

Secured to casting 34 (Figure 1) to swing about pivots 89 and 90 are jaw control levers 91 and 92. Attached to levers 91 and 92 in any suitable way that will permit ready change to other sizes, are jaws 93 and 94 which are recessed to fit around the pitting knives 57. Control levers 91 and 92 are provided with extensions 95 and 96 extending at right angles to the levers and toward each other and provided with inter-engaging teeth 97 that cause the levers to move in unison. The control levers are yieldingly operated by a lever 98 provided with a roller 99 engaging cam 24 before referred to. Lever 98 swings about pivot 89 and has an arm 100 extending above a recess 101 in lever 91. Arranged in said recess is a compression spring 102 that is compressed by a disk 103 threaded on a pin 104 adjustably secured in arm 100, thus transmitting a yielding force through spring 102 so that the jaws may yield when occasion demands. A spring 105 maintains the jaws normally open and keeps the roller 99 in engagement with cam 24.

Figures 1, 4:
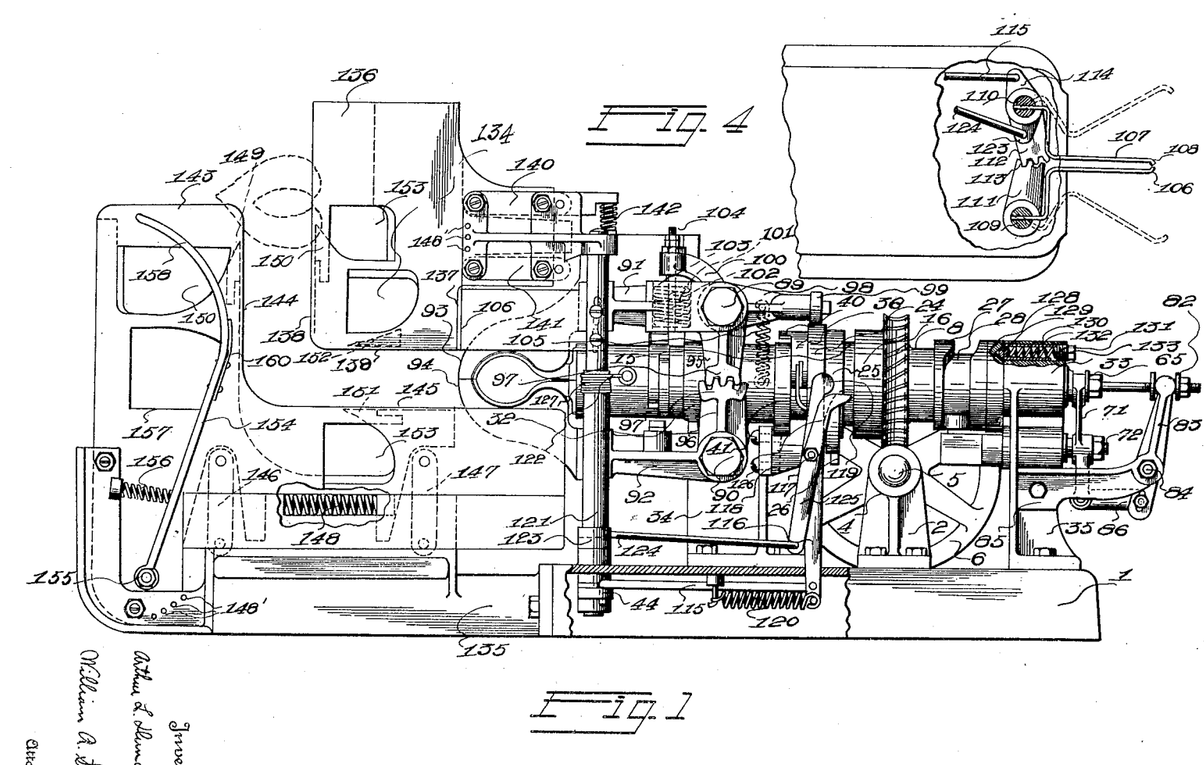
Figure 1 is a side elevation of the improved machine.
Figure 4 is a detail view showing the separating wings and the means for operating them in plan.
Figure 2:
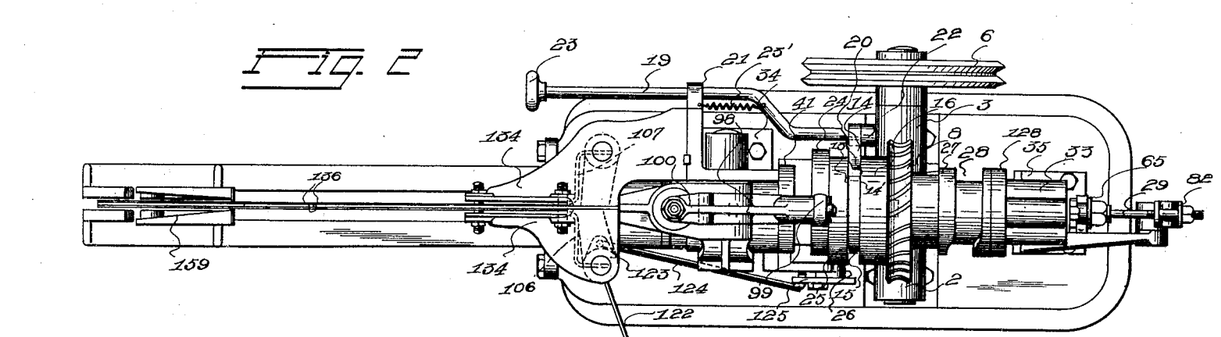
Figure 2 is a plan view thereof.

The halves of the peach are caused to separate by wings 106, 107 arranged preferably on opposite sides of the upper jaw 93 as shown in Figures 1, 2 and 4. As shown in Figure 4 these wings swing on vertical axes to the dotted line position to throw the pulp halves outward. The ends of blades 106 and 107 are turned toward each other as shown at 108 to permit their ready entry in the cut in the peach by means presently to be described. The wings 106, 107 are preferably inserted in slots cut in posts 109 and 110 which are journaled in the frame of the machine in any suitable manner. Posts 109 and 110 have secured thereto members 111 and 112 which extend toward each other and are provided with teeth 113 which mesh and cause simultaneous operation of the wings. Post 110 is provided with an arm 114 preferably arranged below the base 1 of the machine (Figure 1). A link 115 connects the end of said arm to the end of a lever 116 pivoted between its ends at 117 to a bracket 118 secured to casting 34. Lever 116 has a rounded head 119 that lies in the path of cam 25 before referred to. A coil spring 120 maintains lever 116 in position with the wings closed.

A sleeve 121 rotatably mounted on post 110 has secured to its upper end an arm 122 that kicks the pit from between the jaws 93 and 94 and the pitting knives 57 after the wings 106 and 107 have separated the fruit halves from the pit. Sleeve 121 is provided with an actuating arm 123 secured to its lower end. Arm 123 is connected by a link 124 to a lever 125 pivoted at 117 to bracket 118 before referred to. Lever 125 has a nose portion 126 projecting inwardly into the path of pin 26 on cam 25 before referred to. A coil spring 127 serves to maintain the kicker in inoperative position until caused to operate by the action of pin 26 in engaging nose 126 and thus shifting lever 125 and the parts just described.

In order to hold the main shaft 29 and the parts carried thereby in position at the completion of one cycle of operation, until the beginning of the next cycle, a locating collar 128 (Figure 1) is keyed to main shaft 29 adjacent casting 35. Collar 128 is provided with diametrically opposed conical notches 129 in position to be engaged by the helical spring 132 between an adjustable plug 133 and said latch urges the latch outwardly to engage the notches in the locating collar 128.

The fruit to be cored is guided into position between the jaws and pitting knives by means that form a circumferential recess in the peach in the plane of the suture of the pit for the purpose fully pointed out in my Reissue Patent No. 16,259 dated February 9, 1926. This means comprises feed blade brackets 134 and 135 secured to the frame of the machine in any suitable manner. For pitting high grade fruit upper feed blade is preferably composed of two blades 136 separated slightly from each other but secured together to move as a unit. Said blade is cut away as shown at 137 to provide room for wings 106 and 107 and is provided with cutting edges 138 and 139 preferably at right angles to each other, the edges of which are inclined outwardly away from the space between the blades causing the pulp of the fruit to be slightly wedged apart as the circumferential groove is formed. Blade 136 is mounted to swing vertically on parallel links 140, 141 pivoted to the bracket 134 at one end and to the blade at the other. A spring 142 keeps the blade yieldingly in position. The lower blade 143 is likewise preferably composed of two spaced blades secured together to move as a unit for pitting high grade fruit and it too has cutting edges 144 and 145 beveled to cause a wedging action and extending at right angles to each other and spaced from the cutting edges 138 and 139 of the upper blade. Blade 143 continues beneath the lower pitting knife 57 and is arranged so that knife 57 and jaw 94 retreat between the blades when the machine is in position to receive a peach for pitting. Blade 143 swings on a horizontal line on parallel links 146 and 147 pivoted at their lower ends to the bracket 135 and at their upper ends to the blade and a coil spring 148 interposed between suitable projections of the bracket and the blade yieldingly maintains said blade in position. In case it is desired to eliminate the yielding action of the blades suitable holes 148' may be formed in the supporting brackets and blades 135 and 143 through which securing pins may be passed to hold the blades rigidly in the desired relation. In this way a relative adjustment of the blades to vary the size of the pit passageway is permitted.

Gouges 149, 150, 151 and 152 are arranged between the sets of blades to transversely cut and remove the narrow strip of the peach that enters between the blades of each set. Openings 153 in the blades adjacent said gouges permit the discharge of the portions of the annular strip removed during the feeding operation. Preferably the openings are cut in one blade only so as not to provide a ledge upon which the strips can collect. When handling lower grades of fruit the blades may be made solid and the groove in the pulp formed solely by a wedging action in obvious manner without removing a slice.

A tip remover is provided adjacent the path of the peach between blades 136 and 143. Said remover includes a frame 154 pivoted to blade 143 at 155. A spring 156 between said frame and a stop on said bracket urges the frame forwardly against the end wall of an opening 157 in which said frame rides. The upper end 158 of the frame is curved rearwardly and is provided with a deep V-shaped cut 159 from its upper edge (Figure 2). A tip removing blade 160 is secured to said frame in position to cut off the tip of the peach, the curved upper end of the frame and the V-shaped cut therein serving to bring the blade 160 into effective operation on peaches of widely varying sizes, the range of movement of the frame in opening 157 being sufficient for this purpose.

Operation

In operation, the pitting knives 57 and jaws 93 and 94 are normally open and gauge 76 is in its forward position. The peach is inserted in the channel between the blades 143 and 136 with the tip toward the operator as shown in Figure 1, and with the plane of the suture of the pit of the peach indicated by a crease on the outside of the fruit, vertical. The operator then forces the peach downwardly between said blades removing the tip and cutting vertical kerfs in the ends of the peach in the plane of the suture of the pit. If the pit is larger than the space between the blades 143 and 136, blade 143 yields swinging in a horizontal plate on links 146 and 147 against the action of spring 148.

The operator moves the peach to the end of the vertical branch of the path between blades 143 and 136, and then moves it bodily in a horizontal direction between said blades until the stem end of the pit engages gauge 76. At this point in the operation a circumferential recess or groove has been formed around the peach in the plane of the suture of the pit and the halves are slightly wedged apart when they are moved over the wings 106 and 107 and the peach is in position for the cutting out of the pit.

The handle 23 of clutch control rod 19 is in position to be engaged by the hand of the operator as he or she completes the movement of the peach in the horizontal direction, and as the movement of the peach is completed the clutch rod is thrown forwardly thus setting in operation the sleeve 9 and the parts carried thereby. The pawl 38 is not in engagement with one of the teeth 37 on ratchet 36 keyed to the main shaft 29, but is between said teeth. Accordingly, the main shaft does not turn immediately, but the sleeve 9 rotates through part of a revolution before the main shaft is brought into operation, though the cam 27 causes the pitting knives 57 to close entering the circumferential groove in the fruit and to be brought in close proximity to the edges or suture of the pit. The same cam acting through gauge control rod 76 causes the withdrawal of the gauge 77 so that when the knives are rotated the end of said gauge will not mutilate the edges of the fruit halves. At the same time that the operations just described are taking place, cam 24 on sleeve 9 causes the jaws 93 and 94 to follow the knives 57 into the circumferential groove and force the pitting knives against the suture of the pit. In this way the jaws and knives automatically adjust themselves to accommodate varying diameters of pits. When the jaws are closed they serve to support the flesh of the peach immediately adjacent the line of the cut, so that clean cut edges are produced.

After the completion of the above operations pawl 38 on sleeve 9 engages one of the teeth on ratchet 36, resulting in the rotation of the main shaft 29 and pitting knife carrier 54 and knives 57. Knives 57 accordingly cut the halves of the peaches from the central core including the whole pit. After the completion of a half revolution the heel 40 of pawl 38 engages the enlargement on stationary cam 41 thus serving to disconnect the main shaft from rotating sleeve 9. At the same time latch 130 engages notch 129 on locating collar 128 of shaft 29, serving to hold shaft 29 in position for the next operation. Continued rotation of sleeve 9 causes cam 25 to actuate wings 106 and 107 ejecting the pulp halves in opposite directions. Immediately thereafter the pin 26 engages the nose of lever 125 causing the pit kicker 122 to advance and dislodge the pit, which may rest upon lower blade 143. Jaws 93, 94 and blades 57, wings 106 and 107, and kicker 122 then return to their original position as the sleeve 9 automatically stops and the parts are then in position for operation upon the next peach.

In case the pitting knives 57 encounter an obstacle such as an unusually large pit, the slip clutch between the head 42 and ring 52 secured to the main shaft 29 permits shaft 29 to rotate relative to the head 42, thus avoiding breaking the knives. In such a case sleeve 9 stops at the end of a revolution, the machine is cleared of the peach if necessary and the head is turned until the balls 52′ snap back into the recesses in clutch plate 52 with the knives 57 positioned in proper relative position with respect to the guides.

It is to be noted that the jaws 93 and 94 and knives 57 recede between wings 106 and 107 and extensions of the lower blade 143 respectively. If desired the wings 106 and 107 and these extensions of blade 143 may be inclined or flared to wedge the pulp halves apart and to widen the circumferential recess or groove formed in the fruit.

While the invention has been above described in great detail, it should be understood that the invention does not reside in such details which may be varied widely without departing from the spirit of the invention, and that the scope thereof is to be determined from the terms of the following claims.

What I claim is:

1. A peach pitter including spaced halving blades providing an angular path for the pit of the peach between them, and means permitting relative yielding movement between said blades, said last named means maintaining all portions of the cutting edges of said blades in substantial parallelism during such relative yielding movement.

2. A peach pitter including a pair of halving blades, each blade being provided with angularly disposed cutting edges, said blades being spaced apart to provide an angular path through which the pit of the peach is moved, and means permitting relative yielding movement between said angularly disposed cutting edges, said last named means causing said edges to remain in substantial parallelism.

3. A peach pitter including a pair of halving blades, each blade being provided with angularly disposed cutting edges, said blades being spaced apart to provide a path having angularly disposed branches for the pit of the peach, each of said blades being mounted to swing on parallel links and being provided with means that permits the blades to yield to accommodate pits of varying sizes.

4. The combination defined in claim 3 in which one set of parallel links is arranged at right angles to the other set.

5. A peach pitter including means to cause the peach to follow a predetermined course, a tip trimmer mounted adjacent said course in position to trim the tip of the peach as it is caused to follow that course, said tip trimmer including a yieldingly mounted frame that is curved and bifurcated and a tip removing blade secured to said frame, the cutting edge of the latter being spaced from the curved portion of the frame a distance corresponding to the desired depth of the trimming cut.

6. A peach pitter including pitting knives, spaced blades to cut a circumferential groove in the peach and to guide the peach to a position with the pit thereof between said pitting knives, and means to determine the limit of movement of the peach.

7. A peach pitter including adjustable pitting knives, spaced blades to cut a circumferential groove in the peach and to guide the peach to a position between said pitting knives, a gauge to position said peach between said knives, and means to retract said gauge as said knives close about the pit.

8. A peach pitter including means to cut the pit from the peach, said means being adjustable toward and from the pit and rotatable therearound, a separate gauge to position the peach in position to be operated upon by said means, and a mechanism to retract said gauge and to simultaneously adjust said means with respect to the pit.

9. A peach pitter including normally open pitting knives, spaced blades to guide a peach between said knives, means to close said knives, and a separate gauge to determine the limit of movement of the peach in said guiding blades, and means to close said pitting knives and to simultaneously retract said gauge.

10. A peach pitter including a rotatably mounted head, pitting knives pivoted in said head, a gauge slidably mounted in said head, means to swing said knives on their pivots and oppositely moving means to slide said gauge relative to and away from said knives when the knives are brought to their closed or operative position.

11. A peach pitter comprising spaced recessing blades providing a path for the pit of the peach between them, pitting knives arranged across said path, means to separate said knives to receive the pit, one of said blades extending past said knives to guide the peach into position for operation of said knives.

12. A peach pitter comprising spaced blades adapted to form a circumferential recess in the peach and providing a path between them for the pit of the peach, a jaw and a pitting knife mounted so that the cutting part is shifted into and out of said path, said jaw and knife lying below the cutting edge of one of said blades when the jaw and knife are in retracted position, and means to bring said jaw and the cutting part of the knife into operative position in said path.

13. A peach pitter comprising spaced blades providing a path for the pit of the peach between them, means to cut the pit from the peach arranged at the end of said path, power means for driving said pit cutting means and mechanism to control said power means, said last named mechanism including an element arranged adjacent the end of said path in position to be engaged by the operator as the peach is brought to the end of said path.

14. A peach pitter comprising spaced halving blades providing a path for the pit of the peach between them, means to pit the peach and separate the halves of the peach, power means to operate said last named means, and mechanism to control said power means, said mechanism including an element arranged adjacent said blades in position to be engaged by the operator during the movement necessary to bring the peach into position in said pitting means.

15. A peach pitter comprising spaced halving blades designed to cut a circumferential recess in a peach as the peach is moved along said blades with the pit following the path provided by said spaced blades, means designed to enter said recess to cut the pit from the halves of the peach, wings arranged to enter said recess to separate said halves and means to operate said wings when the cutting means has severed the halves from the pit.

16. A peach pitter including two pairs of blades, the blades of each pair being spaced laterally and the pairs of blades being further spaced to provide a path for the pit of the peach, pitting knives, holding jaws recessed to fit around said knives, said knives and jaws being nested between said laterally spaced blades when they are in inoperative position.

17. The combination defined in claim 16 in which a portion of each blade of one pair of blades is mounted to swing away from its adjacent portion to separate the halves from the jaws and knives.

18. A peach pitter including means to position the peach pitting knives, means to hold the peach in position for the operation of said knives, means to rotate said knives to cut the pit from the peach, means to eject the pitted peach, separate means to eject the free pit and mechanism to positively operate said ejecting means.

19. A peach pitter including means to position the peach, pitting knives, means to hold the peach in position for the operation of said knives, means to rotate said knives, and means to positively eject the pitted peach.

20. A peach pitter for use in removing the pit from peaches that have been halved by a circumferential recess, including means to enter said recess and cut the pit from the halves, and separable wings designed to enter the same recess to separate said halves after the pit has been cut therefrom.

21. A peach pitter for use in removing the pit from peaches that have been halved by a circumferential recess cut to the pit, including a slidably mounted gauge to enter said recess and serve as a stop for the pit, pivotally mounted cutting means designed to enter said recess, said cutting means and gauge being interconnected so that the movements of said means within said recess retracts the gauge.

22. A peach pitter for use in removing the pit from peaches that have been halved by a circumferential recess, including means to enter said recess to cut the whole pit from said halves, separable means to laterally separate said halves from the pit, and a pit kicker designed to eject the pit.

23. A peach pitter including a rotatable sleeve, an independently rotatable main shaft, means to rotate said sleeve, means to intermittently couple said sleeve and shaft for simultaneous rotation, pitting knife carriers carried by said shaft, pitting knives carried by said pitting knifecarriers, and means to automatically adjust said knives toward and from the pit of the peach, said last named means including a cam carried by said sleeve.

24. The combination defined in claim 23 including a gauge, said gauge being controlled by means including said cam.

25. A peach pitter comprising a gauge, adjustable jaws, adjustable and rotatable pitting knives and separator wings, and mechanism to retract said gauge and adjust said jaws and knives, mechanism to rotate said knives, mechanism to operate said wings, and means to cause said mechanism to operate in succession.

26. A peach pitter including means to cut the pit from the peach, means to guide a peach into position to be operated upon by said means, said guiding means including separable wings to force the peach away from said pit, and means to operate said wings.

27. A peach pitter including pitting means, means to remove a trimming slice from each half of a peach to be pitted, to form a groove between the trimmed halves of the peach and to guide the peach to a position with the pit thereof between said pitting knives, and adjustable means to stop the peach when the pit thereof is in proper position between said pitting knives.

28. A power driven fruit pitter comprising spaced blades arranged to cut around a substantial portion of the substantially intact pit of the fruit to expose the edge of said pit, rotatable curved pitting means arranged to enter said cut and be centered with respect to said pit by engagement with said exposed edge and power actuated mechanism to operate said pitting means including elements arranged to be put in operation by the operator of the machine when the pit is centered with respect to said pitting means and means arranged to automatically discontinue the operation of said pitting means, after removal of said pit when said pitting means is in substantal alignment with said blades.

29. A fruit pitter having an impaling blade, means for supporting the fruit on the impaling blade, a rotary pitting knife, means for rotating the pitting knife, and means operably connected with said rotating means for arresting the rotation of the pitting knife in predetermined position in relation to said impaling blade after said pitting knife has completed a predetermined rotation.

In testimony whereof I affix my signature.

ARTHUR L. DUNCAN.